United States Patent
Matsuura et al.

(10) Patent No.: US 9,227,497 B2
(45) Date of Patent: Jan. 5, 2016

(54) SEAL STRUCTURE FOR VEHICLE ROOF

(71) Applicants: Nishikawa Rubber Co., Ltd., Hiroshima (JP); HONDA MOTOR CO., LTD., Tokyo (JP)

(72) Inventors: Toshifumi Matsuura, Hiroshima (JP); Shinji Nakanishi, Hiroshima (JP); Ryo Suesada, Saitama (JP); Masaki Soda, Saitama (JP); Takeshi Ishikawa, Saitama (JP)

(73) Assignees: NISHIKAWA RUBBER CO., LTD., Hiroshima (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/615,981

(22) Filed: Feb. 6, 2015

(65) Prior Publication Data

US 2015/0246604 A1 Sep. 3, 2015

(30) Foreign Application Priority Data

Feb. 28, 2014 (JP) .................. 2014-037883

(51) Int. Cl.
- *B60J 10/12* (2006.01)
- *B62D 65/08* (2006.01)
- *B60J 10/00* (2006.01)

(52) U.S. Cl.
CPC .......... *B60J 10/0088* (2013.01); *B60J 10/0074* (2013.01); *B60J 10/12* (2013.01)

(58) Field of Classification Search
CPC .. B60J 7/0084; B60J 10/0014; B60J 10/0017; B60J 10/0031; B60J 10/0045; B60J 10/0088; B60J 10/0074

USPC ........... 296/216.06–216.09, 121, 218; 49/476.1, 479.1, 484.1, 495.1, 498.1

See application file for complete search history.

(56) References Cited

U.S. PATENT DOCUMENTS

| | | | | |
|---|---|---|---|---|
| 4,067,605 A | * | 1/1978 | Green et al. | 296/218 |
| 4,127,302 A | * | 11/1978 | Green | 296/218 |
| 4,193,628 A | * | 3/1980 | Sorensen | 296/215 |
| 4,231,608 A | * | 11/1980 | Sorensen | 296/216.06 |
| 4,786,101 A | * | 11/1988 | Draper | 296/216.05 |
| 2003/0042755 A1 | | 3/2003 | Nozaki | |
| 2005/0155294 A1 | * | 7/2005 | Masuda et al. | 49/498.1 |
| 2013/0307295 A1 | | 11/2013 | Sawada | |

FOREIGN PATENT DOCUMENTS

| | | |
|---|---|---|
| JP | 07-101251 A | 4/1995 |
| JP | 09-164850 A | 6/1997 |
| JP | 2009-046033 A | 3/2009 |
| WO | WO 01/32455 A2 | 5/2001 |

* cited by examiner

*Primary Examiner* — Dennis H Pedder
(74) *Attorney, Agent, or Firm* — Alston & Bird LLP

(57) ABSTRACT

Misalignment of a weather strip is controlled by a corner formed by a shoulder part and a lower inclined part formed in an edge portion of an opening of a roof. A locating face of a sealing part is pressed onto the shoulder part on one side of the corner, and a locating face of an inclined extension part is pressed onto the lower inclined part on the other side of the corner. The sealing part is adhered to at least one of the shoulder part or the upper inclined part with a double-sided tape.

14 Claims, 4 Drawing Sheets

SEAL STRUCTURE FOR VEHICLE ROOF

CROSS-REFERENCE TO RELATED APPLICATION

This application claims priority to Japanese Patent Application No. 2014-037883 filed on Feb. 28, 2014, the entire disclosure of which is incorporated by reference herein.

BACKGROUND

The present disclosure relates to a seal structure for a roof of a vehicle having a retractable or removable roof, such as convertibles, vehicles having a T-bar roof, vehicles having a targa-top roof, etc. In the present specification, upper and lower directions designate upper and lower directions of a vehicle.

As shown in FIG. 1, Japanese Unexamined Patent Publication No. H09-164850 describes a seal structure for a convertible having a roof panel removably attached to a roof The seal structure includes a header weather strip 3 sealing between an edge portion 1 of an opening in a body panel of the convertible and an edge portion of a roof panel 4.

The edge portion 1 of the opening of the body panel includes an inclined part 1a extending obliquely downward toward the inside of the vehicle, and a flange 1b protruding obliquely upward toward the outside of the vehicle from a lower end of the inclined part 1a. A shoulder part 1c is formed at an upper end the inclined part 1a. The header weather strip 3 includes a grip part 3a in which a core metal 2 is embedded. The grip part 3a is fitted on the flange 1b. A hollow main sealing part 3b protrudes upward from an upper end of the grip part 3a. The header weather strip 3 further includes an extension part 3c extending obliquely upward from a sidewall of the grip part 3a along the inclined part 1a. A hollow sub sealing part 3d is provided at an upper end of the extension part 3c to seat on the shoulder part 1c.

When the roof panel 4 is attached to the roof, the hollow main sealing part 3b of the grip part 3a elastically contacts the roof panel 4, and the hollow sub sealing part 3d on the shoulder part 1c elastically contacts the edge portion of the roof panel 4. An EPTSEALER (registered trademark) 5 is provided between the inclined part 1a and the extension part 3c.

As shown in FIG. 2, Japanese Unexamined Patent Publication No. H07-101251 describes a seal structure between a roof center and a hatch roof 7 of a vehicle with a T-bar roof. As shown in FIG. 2, a weather strip 9 is provided in a gutter part 8 of the roof center to which the hatch roof 7 is attached. The weather strip 9 includes a hollow sealing part 9a which elastically contacts the hatch roof 7 to seal an outer edge portion of the hatch roof 7, and a stopper 9 which receives and supports the outer edge portion of the hatch roof 7.

SUMMARY

The header weather strip 3 of the seal structure disclosed by Japanese Unexamined Patent Publication No. H09-164850 is supported by fitting the grip part 3a on the flange 1b. However, more desirably, the sealing part 3d and the extension part 3c are attached to the shoulder part 1c and the inclined part 1a, respectively, using a fixture or the like means to prevent visual defects or water leakage due to separation of the sealing part 3d and the extension part 3c from the edge portion of the opening of the body panel.

To solve this problem, a double-sided tape can be used to attach the weather strip. However, there is no place where fingers of a worker or an exclusive jig can be supported around the sealing part 3d, and the weather strip cannot easily be adhered to the edge portion of the opening with the double-sided tape while supporting the sealing part 3d without misalignment of the sealing part 3d.

The present disclosure provides a seal structure for a roof which makes it possible to surely and easily fix and adhere a sealing part or an extension part of a weather strip to an edge portion of an opening of the roof with a double-sided tape.

Disclosed is a seal structure for a roof of a vehicle having an opening closed by a retractable or removable roof panel, the seal structure includes: a weather strip which is attached to an edge portion of the opening of the roof, and elastically contacts an outer edge portion of the roof panel closing the opening to seal between the roof panel and the opening.

The edge portion of the opening of the roof includes a lower inclined part extending obliquely downward toward an inside of the vehicle, a shoulder part extending from an upper end of the lower inclined part with a corner formed between the shoulder part and the lower inclined part, and an upper inclined part extending obliquely upward from the shoulder part.

The weather strip includes a first sealing part which is attached to the shoulder part, and elastically contacts the outer edge portion of the roof panel closing the opening of the roof, an inclined extension part extending obliquely downward from the first sealing part along the lower inclined part, and a first stopper protruding upward from the first sealing part in a direction opposite to the inclined extension part to receive the outer edge portion of the roof panel closing the opening of the roof.

Misalignment of the weather strip is controlled by the corner, a locating face on a bottom of the first sealing part is pressed onto the shoulder part on one side of the corner, and a locating face of the inclined extension part is pressed onto the lower inclined part on the other side of the corner, and the first sealing part is adhered to at least one of the shoulder part or the upper inclined part with a double-sided tape.

The seal structure can prevent the possibility of visual defects or water leakage due to separation of the first sealing part or the inclined extension part from the edge portion of the opening of the roof The stopper protruding upward from the first sealing part in the direction opposite to the inclined extension part can be pinched with fingers, or an exclusive jig can engage with the stopper. Thus, in attaching the weather strip to the edge portion of the opening of the roof, the stopper can easily be pressed onto the corner formed by the shoulder part and the lower inclined part of the roof by pinching the stopper with the fingers or engaging the exclusive jig with the stopper. With the stopper being pressed in this way, misalignment of the weather strip can be controlled by the corner, and a pressing force is applied to a bottom surface of the first sealing part and the inclined extension part to press the locating face on the bottom of the first sealing part onto the shoulder part on one side of the corner, and to press the locating face of the inclined extension part onto the lower inclined part on the other side of the corner. This can surely prevent the misalignment of the weather strip. As a result, the first sealing part can easily be adhered to at least one of the shoulder part or the upper inclined part. When the opening of the roof is closed by the roof panel, a pressure applied to the stopper by the roof panel is transmitted to the bottom surface of the first sealing part and the inclined extension part as in the case of the attaching of the weather strip, thereby pressing the bottom surface of the first sealing part and the inclined extension part onto the shoulder part and the lower inclined part, respectively. Thus, the misalignment of the weather strip can be prevented.

In a preferred embodiment, a side surface of the stopper facing the opening of the roof and a side surface of the inclined extension part form a surface extending smoothly and continuously to a vicinity of a lower end of the inclined extension part. Thus, when the stopper is pressed onto the corner, the pressing force can efficiently be transmitted to the bottom surface of the first sealing part and the inclined extension part.

In a preferred embodiment, the edge portion of the opening of the roof further includes a flange which is located closer to the opening of the roof than the lower inclined part and protrudes upward, and the weather strip further includes a grip part fitted on the flange, and a second sealing part protruding upward from an upper end of the grip part to elastically contact the roof panel closing the opening of the roof.

According to the preferred embodiment, the first sealing part and the second sealing part of the weather strip elastically contact the roof panel to provide a double seal structure, thereby improving sealing between the weather strip and the roof panel. Since the one side of the weather strip is adhered to the edge portion of the opening of the roof by the double-sided tape, and the grip part on the other side of the weather strip is fitted on the flange at the edge portion of the opening of the roof, the weather strip can more surely be held at the edge portion of the opening of the roof.

In a preferred embodiment, the weather strip further includes a second stopper protruding upward from the upper end of the grip part to receive the roof panel closing the opening of the roof.

According to the preferred embodiment, the roof panel can stably be supported by the two stoppers provided on an inner circumferential side and an outer circumferential side of the weather strip, i.e., the first and second stoppers.

In a preferred embodiment, the edge portion of the opening of the roof further includes an extension part extending transversely from a lower end of the lower inclined part toward the opening of the roof, and a gap is formed between the lower end of the inclined extension part of the weather strip and the extension part.

According to the preferred embodiment, in adhering the first sealing part of the weather strip to the shoulder part of the roof with the double-sided tape, a lower end of the extension part is not caught by the extension part of the roof Thus, the adhering can easily be performed, and the first sealing part does not separate from the shoulder part.

DETAILED DESCRIPTION

Embodiments of the present disclosure will be described below with reference to the drawings. The following preferred embodiments are provided merely for the illustration purpose, and do not limit the present disclosure, application, and use thereof.

Figure 1:
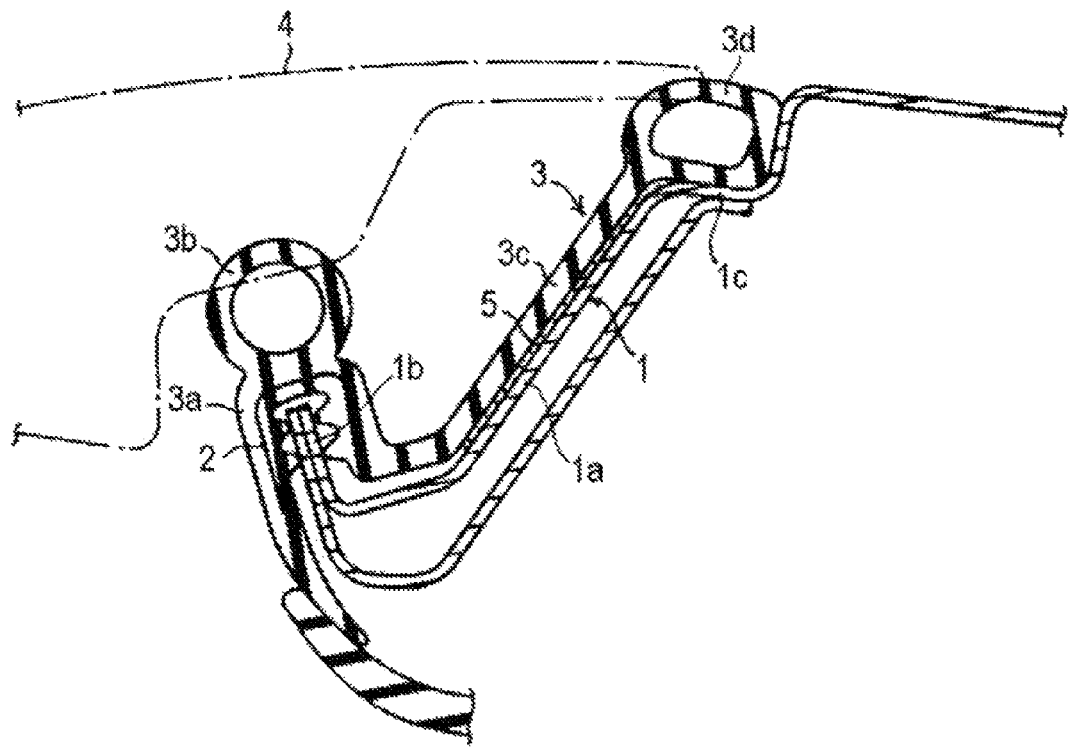
FIG. 1 is a cross-sectional view showing an example of a conventional seal structure for a roof.
Figure 2:
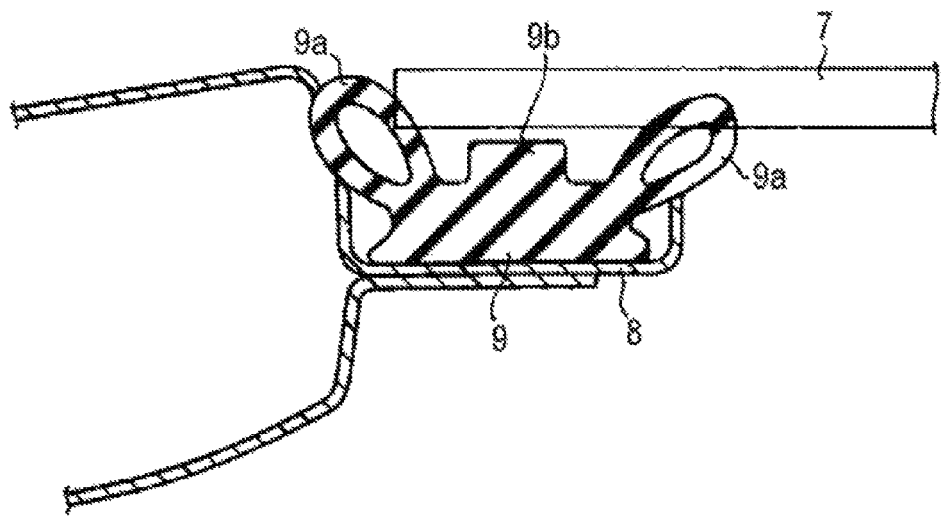
FIG. 2 is a cross-sectional view showing another example of the conventional seal structure for the roof.
Figure 3:
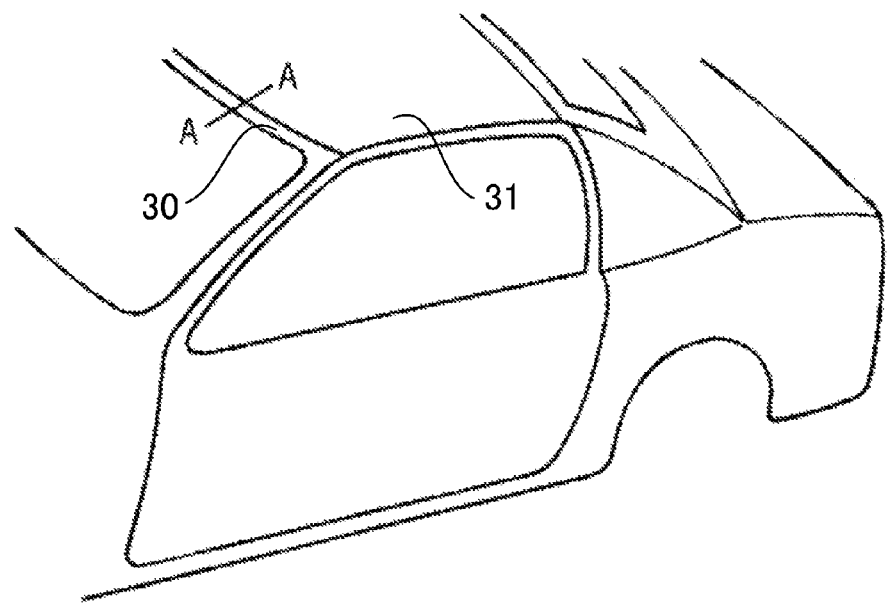
FIG. 3 is a perspective view showing part of an appearance of a convertible.

A convertible shown in FIG. 3 includes a roof 30 of a vehicle body, and a roof panel 31 attached to an edge portion of an opening of the roof 30.

Figure 4:
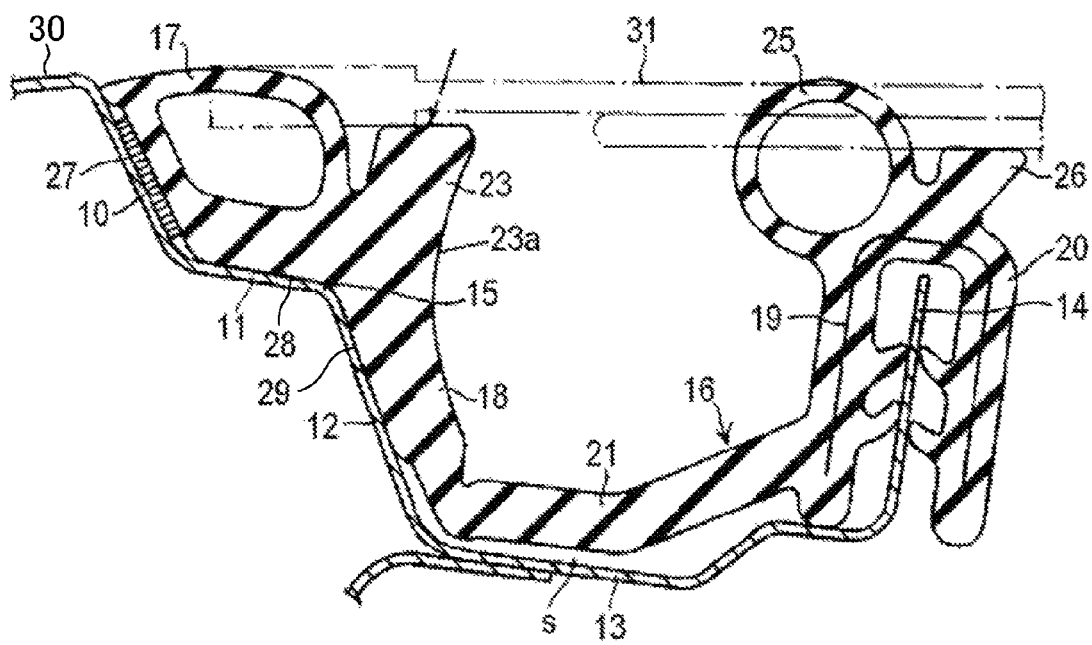
FIG. 4 is a cross-sectional view showing a seal structure for a roof of the present disclosure taken along the line A-A in FIG. 3.

As shown in FIG. 4, the edge portion of the opening of the roof 30 includes a lower inclined part 12 extending obliquely downward toward the inside of the vehicle, a shoulder part 11 extending from an upper end of the lower inclined part 12, an upper inclined part 10 extending obliquely upward from the shoulder part 11, an extension part 13 extending substantially horizontally from a lower end of the lower inclined part 12 toward the opening of the roof 30, and a flange 14 protruding upward from the extension part 13 at an end of the roof 30 closer to the opening. The shoulder part 11 and the lower inclined part 12 have flat surfaces, and are connected through a corner 15.

A weather strip 16 is detachably attached to the edge portion of the opening of the roof 30. The weather strip 16 is made of a rubber-like elastic body, such as EPDM rubber, thermoplastic elastomers, etc., and is formed by extrusion. The weather strip 16 includes a hollow sealing part 17 as a first sealing part attached to the shoulder part 11, an inclined extension part 18 extending obliquely downward along the lower inclined part 12 from the first sealing part 17, a grip part 20 embedded with a core metal 19 and fitted on the flange 14, and a coupling part 21 extending substantially horizontally to couple a lower end of the inclined extension part 18 and the grip part 20.

The weather strip 16 further includes a first stopper 23 which is located adjacent to the first sealing part 17 to be closer to the opening of the roof 30 than the first sealing part 17, and protrudes upward in a direction opposite to the inclined extension part 18, a hollow sealing part 25 as a second sealing part protruding upward from an upper end of the grip part 20, and a second stopper 26 which is located adjacent to the second sealing part 25 to be closer to the opening of the roof 30 than the second sealing part 25, and protrudes upward from an upper end of the grip part 20.

A method of assembling the weather strip 16 to the edge portion of the opening of the roof 30 will be described below.

A double-sided tape 27 having a release paper on one side (registered trademark; 3M) is adhered to a side surface of the first sealing part 17, and the release paper is removed from the double-sided tape 27. Then, a corner formed by a locating face 28 on the bottom of the first sealing part 17 and a locating face 29 of the inclined extension part 18 is fixed to a corner 15 of the edge portion of the opening of the roof 30, the locating face 28 of the first sealing part 17 is fixed to the shoulder part 11, and the locating face 29 of the inclined extension part 18 is fixed to the lower inclined part 12. Thus, misalignment of the weather strip 16 is controlled by the corner 15. In this state, the first stopper 23 is pinched with fingers, and pressed in a direction of an arrow shown in FIG. 4, i.e., toward the corner 15. Then, a pressing force is applied to the first sealing part 17 and the inclined extension part 18, and the locating face 28 on the bottom of the first sealing part 17 is pressed onto the shoulder part 11 on one side of the corner 15, while the locating face 29 on a side surface of the inclined extension part 18 is pressed onto the lower inclined part 12 on the other side of the corner 15.

Figure 5:
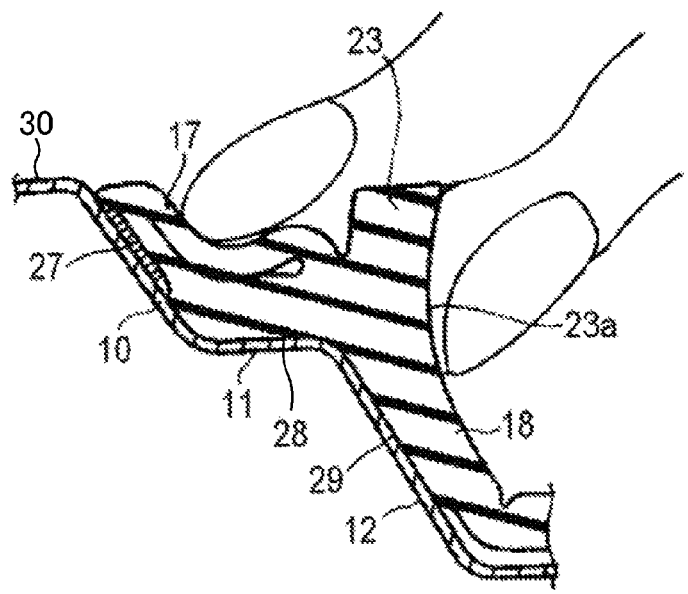
FIG. 5 is a cross-sectional view showing a first stopper pinched with fingers and pressed toward a corner of an edge portion of an opening of a roof.

Subsequent to the pressing of the first stopper 23, the first sealing part 17 is squashed and pressed onto the upper inclined part 10 as shown in FIG. 5. By squashing the first sealing part 17, the side surface of the first sealing part 17 is adhered to the upper inclined part 10 extending upward from the shoulder part 11 with the double-sided tape 27. Thus, one side of the weather strip 16 is adhered to the edge portion of the opening of the roof 30.

As shown in FIGS. 4 and 5, a side surface 23a of the first stopper 23 facing the opening of the roof 30 is curved in the shape of a recess to be continuous with a side surface of the inclined extension part 18 extending along the lower inclined part 12 of the edge portion of the opening of the roof 30 so that the pressing force generated when the first stopper 23 is pressed in the direction of the arrow shown in FIG. 4, i.e., toward the corner 15, is easily divided to the first sealing part 17 and the inclined extension part 18. Specifically, the side surface 23a of the first stopper 23 and the side surface of the inclined extension part 18 form a smoothly and continuously curved surface extending to a vicinity of a lower end of the inclined extension part 18. Thus, the stopper 23 can easily be pinched with the fingers, and the locating face 29 of the inclined extension part 18 can easily be pressed onto the lower inclined part 12. A top surface of the first stopper 23 is substantially parallel with the shoulder part 11. Accordingly, the pressing force applied to both of the shoulder part 11 and the inclined part 12 is naturally generated when the first stopper 23 is pinched with a finger placed on the side surface 23a facing the inside of the vehicle and a finger placed on the top surface of the first stopper 23 as shown in FIG. 5.

In the above-described embodiment, the first stopper 23 is pinched with the fingers and pressed toward the corner 15 to press the locating face 28 onto the shoulder part 11 on the one side of the corner 15, and to press the locating face 29 onto the inclined part 12 on the other side of the corner 15. In place of the fingers, an exclusive jig may be used.

Figure 6:
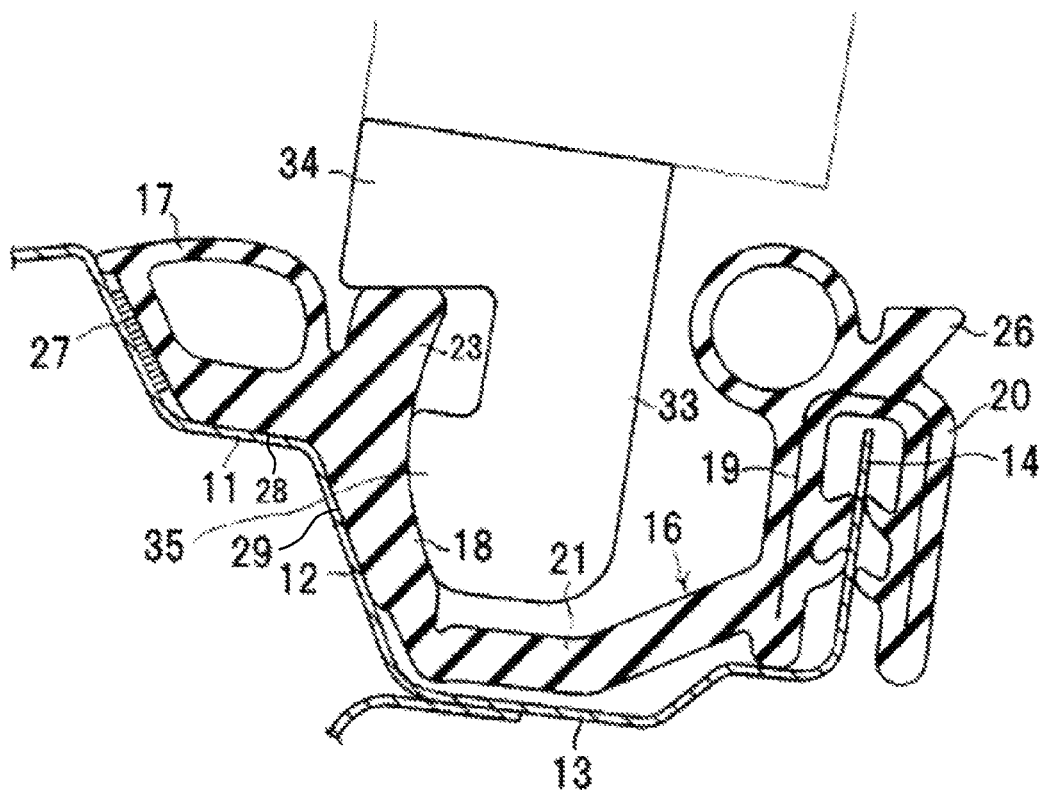
FIG. 6 is a cross-sectional view showing the first stopper pressed toward the corner of the edge portion of the opening of the roof using an exclusive jig.

FIG. 6 shows an example of use of an exclusive jig 33. The exclusive jig 33 has a substantially J-shaped cross section, and includes a top pressing part 34 which contacts the top surface of the first stopper 23, and a side pressing part 35 which contacts the side surface 23a of the first stopper 23. The exclusive jig 23 is attached to an automatic device which is not shown, and is configured to attach the weather strip 16 in the same manner as in the above-described embodiment by pressing the first stopper 23 from above with the top pressing part 34, and laterally pressing the side surface 23a of the first stopper 23 with the side pressing part 35 as shown in FIG. 6.

In attaching the weather strip 16 to the edge portion of the opening, a recessed groove may be formed at a boundary between the locating face 28 of the first sealing part 17 and the locating face 29 of the inclined extension part 18 to form a gap between the boundary and the corner 15 so that the boundary between the locating face 28 and the locating face 29 do not interfere with the corner 15.

The one side of the weather strip 16 is attached to the edge portion of the opening of the roof 30 as described above (adhered to the edge portion of the opening of the roof 30 with the double-sided tape 27). Before or after the attaching, the grip part 20 on the other side of the weather strip 16 is fitted on the flange 14. FIG. 4 shows the weather strip 16 attached to the edge portion of the opening of the roof 30. A lower end of the inclined extension part 18 and the coupling part 21 of the weather strip 16 are located above the extension part 13 of the edge portion of the opening of the roof 30 to form a gap s therebetween. With the presence of the gap, the lower end of the inclined extension part 18 is not caught by the extension part 13 when the first sealing part 17 is adhered to the shoulder part 11, and the first sealing part 17 does not separate from the shoulder part 11.

In the illustrated first embodiment, the whole coupling part 21 is located above the extension part 13 with a gap formed therebetween. However, part or most part of the coupling part 21 may contact the extension part 13 as long as the lower end of the inclined extension part 18 is separated from the extension part 13 so that the lower end of the inclined extension part 18 is not caught by the extension part 13 in adhering the first sealing part 17 to the shoulder part 11.

When the removable roof panel 31 is attached to the roof as indicated by a dot-and-dash line in FIG. 4, an outer edge portion of the roof panel 31 elastically contacts the first sealing part 17 and squashes the first sealing part 17. Thus, the roof of the vehicle is sealed, and the roof panel 31 is received and supported by the first stopper 23. With the roof panel 31 being attached, a load pressing the stopper 23 in the direction of the arrow shown in FIG. 4, i.e., toward the corner 15, is applied by the roof panel 31 due to the presence of the curved side surface 23a of the stopper 23, and the locating faces 28 and 29 are pressed onto the shoulder part 11 and the inclined part 12 in the same manner as the locating faces 28 and 29 are pressed in attaching the weather strip 16. Thus, just like the case of attaching the weather strip 16, the weather strip 16 is pressed onto the edge portion of the opening of the roof 30 by the force applied in the direction of the arrow shown in FIG. 4 with the misalignment of the weather strip 16 being controlled by the corner 15. Therefore, the weather strip 16 is not misaligned by the attaching of the roof panel 31.

One or both of the locating faces 28 and 29 can be adhered with the double-sided tape or a butyl sealant. When the roof panel 31 is attached to the roof 30, the load of the roof panel 31 presses the locating faces 28 and 29 to enhance the adhesion of the locating faces 28 and 29 to the roof 30 with the double-sided tape, etc. This can surely prevent the weather strip 16 from separating and detaching from the roof.

Figure 7:
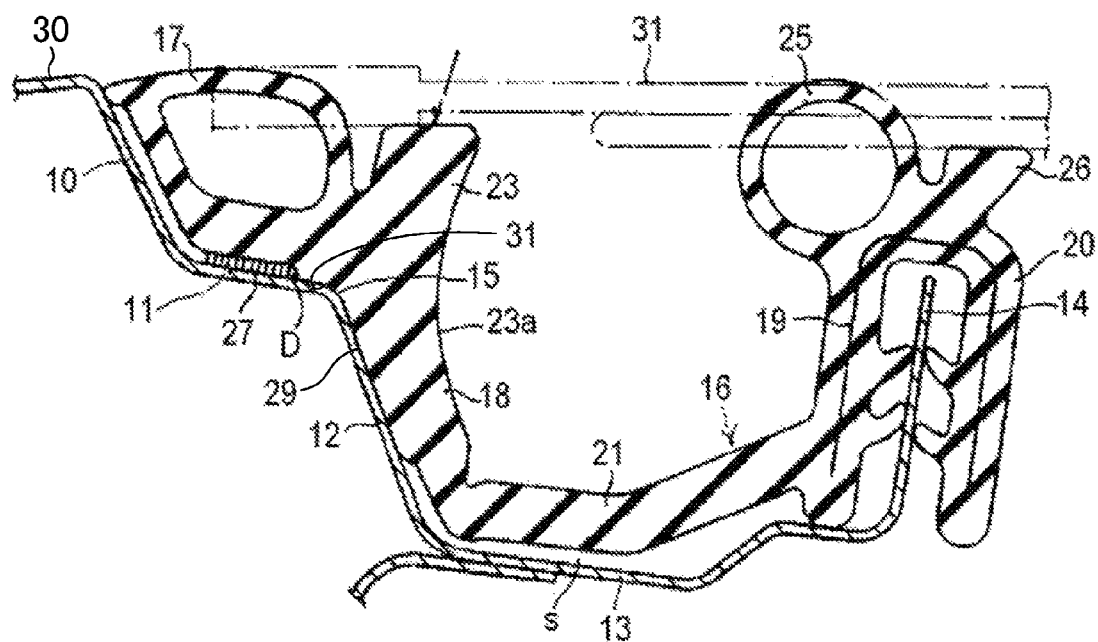
FIG. 7 is a cross-sectional view showing another embodiment of the seal structure for the roof of the present disclosure.

FIG. 7 shows a seal structure for a roof of a second embodiment. In the second embodiment, the first sealing part 17 is fixed and adhered not at the side surface, but at the bottom surface. Other features of the second embodiment are the same as those of the first embodiment.

As described above, in the second embodiment, the first sealing part 17 on the one side of the weather strip 16 is adhered to the shoulder part 11 of the edge portion of the opening of the roof 30. A step D is provided in the bottom surface of the first sealing part 17, and the double-sided tape 27 is provided in a recess formed by the step D. In this structure, part of the bottom surface of the first sealing part 17 closer to the opening of the roof 30 than the step D serves as a locating face 31. In attaching the weather strip 16, the locating face 29 of the inclined extension part 18 is brought into contact with the lower inclined part 12, and then the first stopper 23 is pressed in a direction of an arrow shown in FIG. 7 toward the corner 15 in the same manner as in the first embodiment. Thus, the pressing force is applied from the first sealing part 17 to the shoulder part 11, thereby fixing and adhering the first sealing part 17 to the shoulder part 11.

Part of the roof panel 31 inside of an outer edge thereof elastically contacts the second sealing part 25, and is received and supported by the second stopper 26. Thus, the roof panel 31 is sealed at two positions, i.e., at the outer edge by the first sealing part 17, and at the part inside of the outer edge by the second sealing part 25, and is supported by the first stopper 23 and the second stopper 26.

The disclosed weather strip 16 does not essentially include the grip part 20 including the second sealing part 25 and the second stopper 26, and the coupling part 21, and these parts may be omitted. When these parts are omitted, the weather strip 16 is constituted of the first sealing part 17, the inclined extension part 18, and the first stopper 23.

The roof panel 31 of the above-described embodiments is removable. However, the roof panel 31 may be retractable without removing from the roof.

In the above-described embodiments, the seal structure for the roof is applied to a header on a front side of a convertible. However, the seal structure can also be applied to a rear side of the convertible, and can also be applied to the edge portion of the opening of the roof of other vehicles than the convertibles, such as vehicles with a T-bar roof, vehicles with a targa-top roof, etc.

What is claimed is:

1. A seal structure for a roof of a vehicle having an opening closed by a retractable or removable roof panel, the seal structure comprising:
   a weather strip which is attached to an edge portion of the opening of the roof, and elastically contacts an outer edge portion of the roof panel closing the opening to seal between the roof panel and the edge portion, wherein
   the edge portion of the opening of the roof includes a lower inclined part extending obliquely downward toward an inside of the vehicle, a shoulder part extending from an upper end of the lower inclined part with a corner formed between the shoulder part and the lower inclined part, and an upper inclined part extending obliquely upward from the shoulder part,
   the weather strip includes a first sealing part which is attached to the shoulder part, and elastically contacts the outer edge portion of the roof panel closing the opening of the roof, an inclined extension part extending obliquely downward from the first sealing part along the lower inclined part, and a first stopper protruding upward from the first sealing part in a direction opposite to the inclined extension part to receive the outer edge portion of the roof panel closing the opening of the roof,
   misalignment of the weather strip is controlled by the corner,
   a locating face on a bottom of the first sealing part is pressed onto the shoulder part on one side of the corner, and a locating face of the inclined extension part is pressed onto the lower inclined part on the other side of the corner,
   the first sealing part is adhered to at least one of the shoulder part or the upper inclined part with a double-sided tape, and
   a side surface of the first stopper facing the opening of the roof and a side surface of the inclined extension part form a surface extending smoothly and continuously to a vicinity of a lower end of the inclined extension part.

2. The seal structure for the roof of the vehicle of claim 1, wherein
   the edge portion of the opening of the roof further includes a flange which is located closer to the opening of the roof than the lower inclined part and protrudes upward, and
   the weather strip further incudes a grip part fitted on the flange, and a second sealing part protruding upward from an upper end of the grip part to elastically contact the roof panel closing the opening of the roof.

3. The seal structure for the roof of the vehicle of claim 2, wherein
   the weather strip further includes a second stopper protruding upward from the upper end of the grip part to receive the roof panel closing the opening of the roof.

4. The seal structure for the roof of the vehicle of claim 2, wherein
   the edge portion of the opening of the roof further includes an extension part extending transversely from a lower end of the lower inclined part toward the opening of the roof, and
   a gap is formed between the lower end of the inclined extension part of the weather strip and the extension part.

5. The seal structure for the roof of the vehicle of claim 3, wherein
   the edge portion of the opening of the roof further includes an extension part extending transversely from a lower end of the lower inclined part toward the opening of the roof, and
   a gap is formed between the lower end of the inclined extension part of the weather strip and the extension part.

6. A seal structure for a roof of a vehicle having an opening closed by a retractable or removable roof panel, the seal structure comprising:
   a weather strip which is attached to an edge portion of the opening of the roof, and elastically contacts an outer edge portion of the roof panel closing the opening to seal between the roof panel and the edge portion, wherein
   the edge portion of the opening of the roof includes a lower inclined part extending obliquely downward toward an inside of the vehicle, a shoulder part extending from an upper end of the lower inclined part with a corner formed between the shoulder part and the lower inclined part, and an upper inclined part extending obliquely upward from the shoulder part,
   the weather strip includes a first sealing part which is attached to the shoulder part, and elastically contacts the outer edge portion of the roof panel closing the opening of the roof, an inclined extension part extending obliquely downward from the first sealing part along the lower inclined part, and a first stopper protruding upward from the first sealing part in a direction opposite to the inclined extension part to receive the outer edge portion of the roof panel closing the opening of the roof,
   misalignment of the weather strip is controlled by the corner,
   a locating face on a bottom of the first sealing part is pressed onto the shoulder part on one side of the corner, and a locating face of the inclined extension part is pressed onto the lower inclined part on the other side of the corner,
   the first sealing part is adhered to at least one of the shoulder part or the upper inclined part with a double-sided tape,
   the edge portion of the opening of the roof further includes a flange which is located closer to the opening of the roof than the lower inclined part and protrudes upward, and
   the weather strip further includes a grip part fitted on the flange, and a second sealing part protruding upward from an upper end of the grip part to elastically contact the roof panel closing the opening of the roof.

7. The seal structure for the roof of the vehicle of claim 6, wherein
   the weather strip further includes a second stopper protruding upward from the upper end of the grip part to receive the roof panel closing the opening of the roof.

8. The seal structure for the roof of the vehicle of claim 7, wherein the edge portion of the opening of the roof further includes an extension part extending transversely from a lower end of the lower inclined part toward the opening of the roof, and a gap is formed between the lower end of the inclined extension part of the weather strip and the extension part.

9. The seal structure for the roof of the vehicle of claim 6, wherein the edge portion of the opening of the roof further includes an extension part extending transversely from a lower end of the lower inclined part toward the opening of the roof, and a gap is formed between the lower end of the inclined extension part of the weather strip and the extension part.

10. The seal structure for the roof of the vehicle of claim 6, wherein a side surface of the first stopper facing the opening of the roof and a side surface of the inclined extension part form a surface extending smoothly and continuously to a vicinity of a lower end of the inclined extension part.

11. The seal structure for the roof of the vehicle of claim 10, wherein the edge portion of the opening of the roof further includes a flange which is located closer to the opening of the roof than the lower inclined part and protrudes upward, and the weather strip further incudes a grip part fitted on the flange, and a second sealing part protruding upward from an upper end of the grip part to elastically contact the roof panel closing the opening of the roof.

12. The seal structure for the roof of the vehicle of claim 11, wherein the weather strip further includes a second stopper protruding upward from the upper end of the grip part to receive the roof panel closing the opening of the roof.

13. The seal structure for the roof of the vehicle of claim 12, wherein the edge portion of the opening of the roof further includes an extension part extending transversely from a lower end of the lower inclined part toward the opening of the roof, and a gap is formed between the lower end of the inclined extension part of the weather strip and the extension part.

14. The seal structure for the roof of the vehicle of claim 11, wherein the edge portion of the opening of the roof further includes an extension part extending transversely from a lower end of the lower inclined part toward the opening of the roof, and a gap is formed between the lower end of the inclined extension part of the weather strip and the extension part.

* * * * *